Oct. 23, 1951  J. CHARLTON  2,572,447
PURIFICATION OF EFFLUENT FROM DISTILLERIES
Filed May 7, 1947
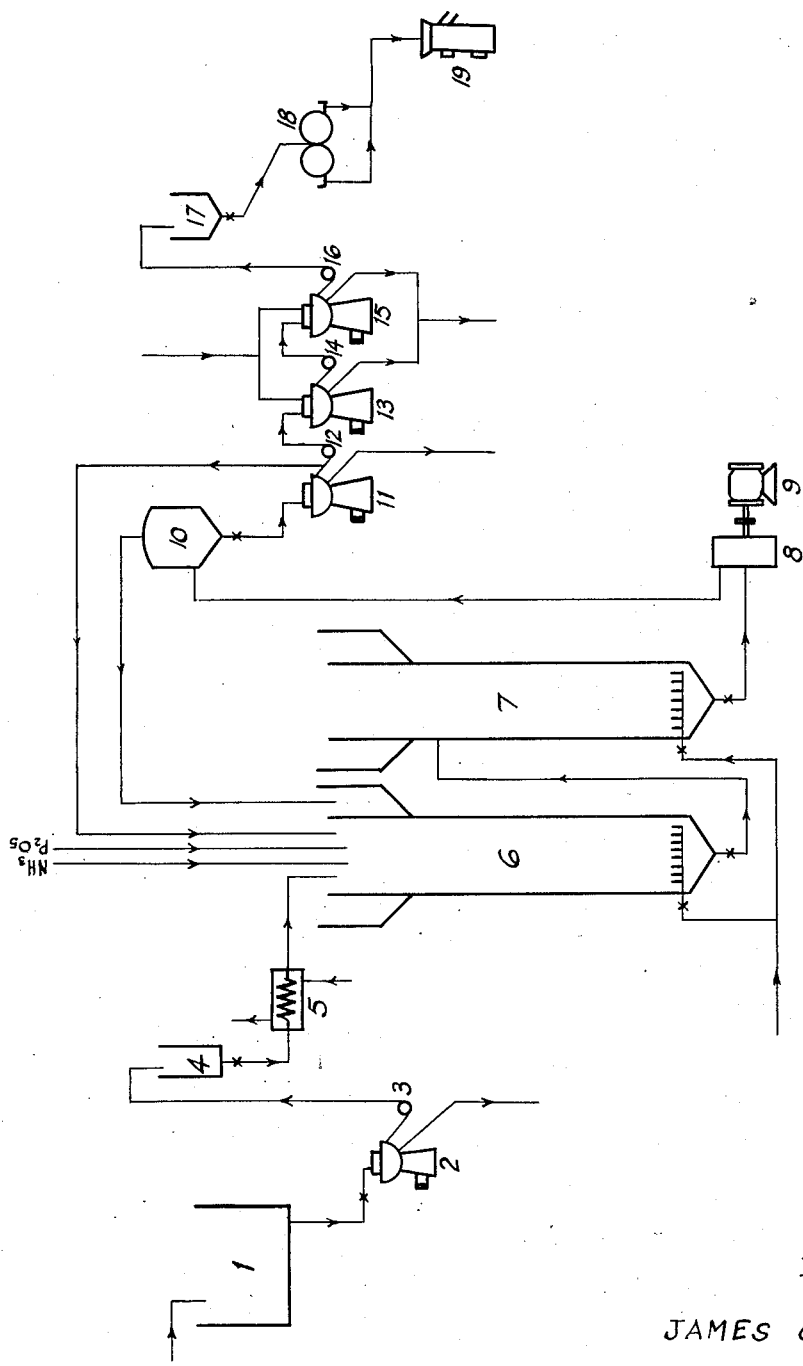
INVENTOR
JAMES CHARLTON
BY
ATTY.

Patented Oct. 23, 1951

2,572,447

UNITED STATES PATENT OFFICE 2,572,447

PURIFICATION OF EFFLUENT FROM DISTILLERIES

James Charlton, Parkwood, Johannesburg, Transvaal, Union of South Africa

Application May 7, 1947, Serial No. 746,459

5 Claims. (Cl. 195—106)

This invention relates to the purification of effluent from distilleries using molasses as raw material.

The hitherto known methods of purification of such effluents are not very satisfactory and involve considerable expense.

The main object of this invention is the provision of a process for the purification of effluent from distilleries which is simple, speedy and inexpensive. Another object of this invention is the provision of such process which produces a by-product the value of which is more than sufficient to cover the costs of the process.

Applicant has found that if the effluent is first clarified and then treated with certain chemicals, the effluent so treated can be satisfactorily purified by means of food yeast producing organisms.

A process according to this invention accordingly comprises the steps of removing suspended solids from the effluent; adding to said effluent food yeast organisms, and additional nutrient for said organisms, aerating the effluent so treated until said organisms and the products of their multiplication have used up materially all of the nitrogenous organic matter in the liquid, and separating the purified liquid from the food yeast.

The term "food yeast organisms" is intended to include all such organisms which have a high rate of reproduction and which are efficient in breaking down pentoses and pentosans as well as acetic acid, lactic acid and the salts of said acids.

When the process is to be carried out in a hot climate, said organisms must be able to withstand such temperatures as occur in such climates.

A great number of organisms are known which are suitable for the purpose of this invention. They include in particular pseudo yeasts of the group consisting of Torula and Monilia, such as *Torula utilis* and such as *Monilia candida* and *Candida arborea*.

The additional nutrient comprises preferably ammonia or ammonia salt and a compound of phosphorus, such as orthophosphoric acid or a salt thereof.

The process of this invention may be carried out as a continuous process or as an intermittent process.

The invention will be further described with reference to the accompanying drawing which is a flow sheet of an example of a continuous process according to this invention.

A typical distillery effluent from which ethanol has been removed by distillation, has the following analysis:

| | Parts per 100,000 |
|---|---|
| Oxygen absorbed—3 minutes | 600–800 |
| Oxygen absorbed—4 hours | 1500–2500 |
| Solids in suspension | 0–1000 |
| Total solids | 7500–10,000 |
| Free ammonia | 4–12 |
| Albuminoid ammonia | 6–16 |
| Total nitrogen | 90–110 |
| pH | 3.8–4.6 |

The hot distillery effluent is collected in a tank 1. From there it passes through a centrifuge 2 which separates from the effluent substantially all such matter as is suspended therein. The clarified effluent is passed as by a pump 3 to a storage vessel 4. From the vessel 4, the clarified effluent flows through a heat exchanger 5 in which it is cooled to a temperature of about 97° F., to a fermenter 6 and thence to a further fermenter 7.

In the fermenter 6, the clarified effluent has added thereto live food yeast organisms as well as additional nutrient for such organisms. Such additional nutrient comprises ammonia or its salts and orthophosphoric acid or salts thereof.

The proportion of live organisms in the fermenters is preferably maintained at about 8% by weight (measured in the wet condition) of the effluent—irrespective of the composition of the latter; just enough ammonia (or ammonium salt) is added to keep the formol titration below 0.5, and the addition of phosphorus compound is preferably so selected that the resulting food yeast (when dried) comprises about 1.8% to 2% of phosphorus while the effluent is materially free from phosphates.

Compressed air at about 15 lbs. per square inch is continuously forced through the fermenters 6 and 7, which are preferably maintained at about 100° F., and the rate of flow of the effluent through the fermenters is so adjusted that the organisms in multiplying use up most of the organic matter contained in the liquid and so that the effluent (after the separation of the food yeast therefrom) is inoffensive enough to allow of its being discharged directly into the drains.

The effluent with the yeast organisms is passed through a foam breaker 8 (which is driven by a motor 9) to a surge tank 10 and any froth is returned for recycling from the top of the surge tank 10 to the fermenter 6. From the tank 10 the liquid flows to a first separator 11. The liquors discharged from this separator may be treated for the recovery of potassium salts, or may be discharged directly into the drains. The food yeast cream discharged by said separator 11 is passed by a pump 12 to washing separator 13 and, via a pump 14, to washing separator 15; sufficient of said food yeast cream being returned to the fermenters 6 and 7 to maintain the concentration of live food yeast organisms therein, as aforementioned, at about 8%.

The remainder of the food yeast is washed in the separators 13 and 15, is thence passed by the pump 16 into a storage tank 17 and is then dried on drum roller driers 18 and finally ground by a roller mill 19.

The effluent from the washing separators 13 and 15 is passed directly to the drains.

The aforedescribed process, when carried out with maximum efficiency, results in an effluent which is unobjectionable because suspended solids are substantially absent, the titratable acidity (as compared with that of the original effluent) is reduced and the biological oxygen demand is greatly diminished; the purified effluent being to a large degree stabilised. Also the process produces a quantity of food yeast the value of which is more than great enough to cover the costs of the purification.

I claim:

1. A process for purifying and rendering readily disposable the effluent from distilleries using molasses as raw material for the production of alcohol, which essentially consists in removing suspended solids from the effluent; adding to said effluent food yeast organisms and inorganic nutrient for said food yeast organisms, including the ammonium group in amount sufficient to keep the formol titration below 0.5, said food yeast organisms being selected from the class consisting of pseudo yeasts of the group consisting of Torula and Monilia, and which have a high rate of reproduction and which are efficient in breaking down pentoses and pentosans as well as acetic acid, lactic acid and the salts of said acids; aerating the effluent so treated until said organisms and the products of their multiplication have used up materially all of the nitrogenous organic matter in the liquid; and separating the purified liquid from the food yeast.

2. A process for purifying and rendering readily disposable the effluent from distilleries using molasses as raw material for the production of alcohol, which essentially consists in removing suspended solids from the effluent; adding to said effluent food yeast organisms and inorganic nutrient for said food yeast organisms, said inorganic nutrient comprising the ammonium group in amount sufficient to keep the formol titration below 0.5 and also comprising phosphorus in assimilable form, said food yeast organisms being selected from the class consisting of pseudo yeasts of the group consisting of Torula and Monilia and which have a high rate of reproduction and which are efficient in breaking down pentoses and pentosans as well as acetic acid, lactic acid and the salts of said acids; aerating the effluent so treated until said organisms and the products of their multiplication have used up materially all of the phosphorus compound dissolved in the liquid; and separating the purified liquid from the food yeast.

3. A process as claimed in claim 2 in which the food yeast organisms comprise *Torula utilis*.

4. A process as claimed in claim 2 in which the food yeast organisms comprise pseudo yeasts in the subgroup Monilia.

5. The process claimed in claim 2 comprising the step of continuously separating food yeast cream from fermented liquid which has been passed through fermenters and reintroducing into the fermenters as much of said yeast cream as is required to maintain a concentration of about 8% of live organisms (measured in the wet condition) in the fermenters.

JAMES CHARLTON.

REFERENCES CITED

The following references are of record in the file of this patent:

UNITED STATES PATENTS

| Number | Name | Date |
|---|---|---|
| 1,532,858 | Bacon | Apr. 7, 1925 |
| 1,698,800 | Ludicke et al. | Jan. 15, 1929 |
| 1,884,272 | Sak | Oct. 25, 1932 |
| 1,910,265 | Shaver et al. | May 23, 1935 |
| 2,008,584 | King et al. | July 16, 1935 |
| 2,023,087 | McCutchan et al. | Dec. 3, 1935 |
| 2,182,550 | Christensen | Dec. 5, 1939 |
| 2,261,918 | Pittman | Nov. 4, 1941 |
| 2,447,814 | Novak | Aug. 24, 1948 |
| 2,483,855 | Stiles | Oct. 4, 1949 |